Sept. 8, 1959   R. JOVANOVICH   2,903,258
MACHINE REPAIR STAND
Filed Sept. 10, 1956
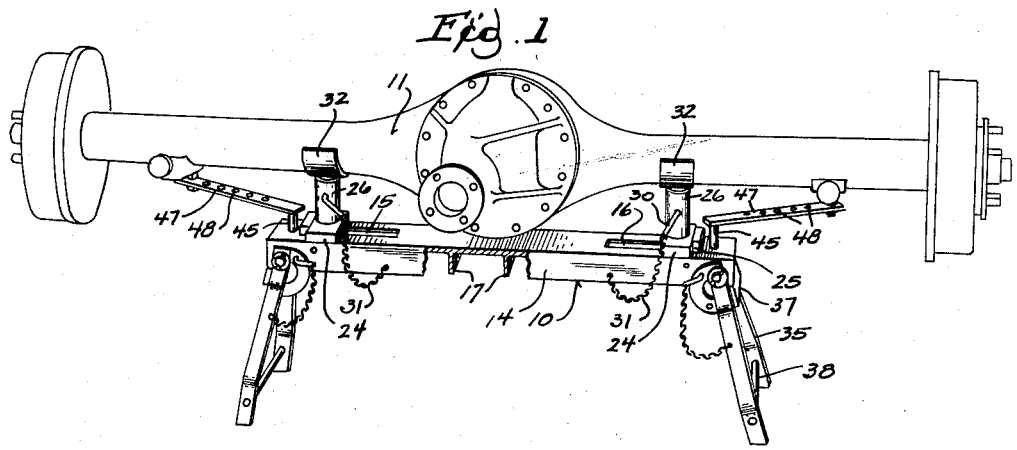
Fig. 1
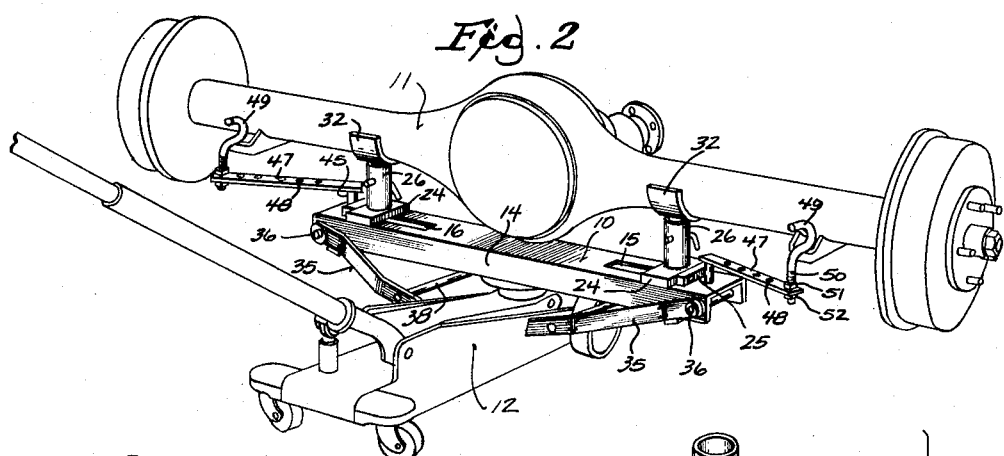
Fig. 2
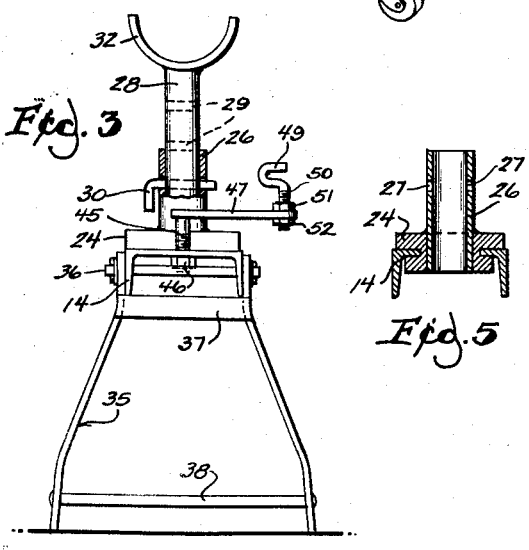
Fig. 3
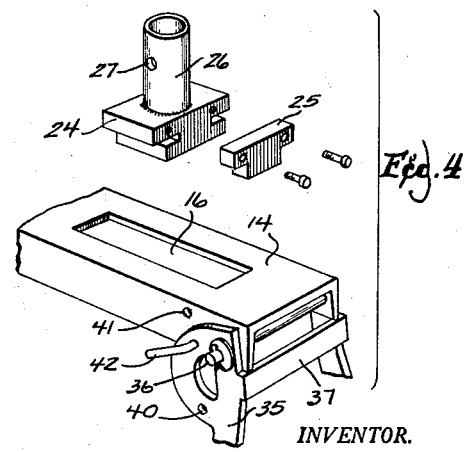
Fig. 4
Fig. 5
INVENTOR.
ROBERT JOVANOVICH
BY Miles Henninger
ATTORNEY

2,903,258
MACHINE REPAIR STAND

Robert Jovanovich, Milwaukee, Wis.

Application September 10, 1956, Serial No. 608,949

3 Claims. (Cl. 269—155)

This invention relates to improvements in a cradle or receiver and stand for automobile differential assemblies and the like to be repaired, and which is capable of holding the differential assembly in a desired position while the repair work is being done.

It is one object of the present invention to provide a receiver-stand for automobile differential assemblies and the like, which is easily and securely placed on the usual wheeled floor jack for raising the receiver into position at which the differential assembly is supported when disconnected from other parts of an automobile or can be brought into alignment with other parts of the automobile when the differential is to be connected therewith.

Another object of the invention is to provide a receiver-stand for securely holding an automobile differential or the like against tipping or other undesired movement after disconnection from other parts and while it is drawn away from such other parts to a position for working on the assembly and while it is being returned to re-aligned position for reconnection with other parts.

Another object of the invention is to provide a receiver-stand for receiving and holding an automobile differential assembly and the like and which will hold such assembly at a convenient height after removal of a wheeled floor jack and in which the assembly can be turned to and held in a given position.

Another object of the invention is to provide a receiver-stand for automobile differential assemblies and the like in which both the saddles receiving the differential and the means for holding the differential in given position, are easily and quickly adjustable to accommodate the various shapes and sizes of such assemblies, and positively hold the assembly in a given position.

Advantages and objects other than those above set forth will be apparent from the following description when read in connection with the accompanying drawing in which:

Fig. 1 is a side elevation showing the present receiver-stand with a differential assembly held thereon and supported thereby for position for work on such differential;

Fig. 2 is a perspective view showing the receiver-stand with a differential thereon and supported by a usual type of wheeled jack for movement of the differential away from or toward other parts of an automobile;

Fig. 3 is an end elevation of the receiver-stand;

Fig. 4 is a perspective view of a fragment of the receiver-stand with parts of a saddle column in spaced relation to show how the column is adjustably retained in the main member of the stand; and Fig. 5 is a cross-sectional view on a central plane through parts of the main member portion and of the saddle column of a stand, when in assembled relation.

Referring specifically to the drawing by reference numerals, the numeral 10 generally designates the present receiver-stand on which an automobile differential assembly designated 11 is to be received and held, and 12 generally designates a usual type of wheeled floor jack by which the receiver-stand 10 is to be raised to the original position of the differential 11, withdrawn, lowered and replaced in its original position. The receiver-stand 10 comprises a main body of a structural steel channel 14 of the so-called heavy size to form a rigid body even though slots 15 and 16 are cut into the channel web toward both ends of the main member. The channel of the main member 14, is of such width as to allow entry of the lifting head of any of the usual types of wheeled floor jacks designated 12 as a whole and which is not further described. A pair of plates 17 are fixed in the channel at distances from the center longitudinally of the channel to form a socket slightly larger than the usual jack head and sufficiently close to the center of the receiver-stand for balancing the same when it is raised by the jack.

A pair of identical saddle columns are severally adjustably held in the channel slots 15, 16, each of the saddle columns including a base block 24 of generally H-shaped cross-section with one leg of the H slightly longer than the width of a channel slot and the other leg slightly shorter than the width of such slot. Hence, the base block 24 can be inserted through a main member slot and turned to engage the edges defining such slot, in the grooves of the base block. After the base block 24 has been inserted into a main member slot, a T-shaped block 25 is attached as by screws to an end of the base block, the leg of the T-block fitting relatively closely in the main member slot and limiting movement of the saddle column to movement longitudinally of the slot only.

Each base block 24 has a central hole into which a base tube 26 is fixed and such tube has a pair of apertures 27 diametrically therethrough. Another tube 28 slidably fits in the base tube 26 and has a plurality of sets of diametric apertures 29 by which the tube 28 may be held by a pin 30 when apertures 27 are aligned with a set of the apertures 29 at various positions of tube 28 axially of tube 26. Pin 30 is attached by a chain 31 to the main member 14. The parts 24 through 30 form an adjustable column with a semi-circular plate 32 fixed on the upper end of the tube 28 to form a saddle in which an automobile differential assembly or the like may be seated and held.

A pair of legs 35 is pivoted at 36 at each end of the main member 14, the legs being suitably braced as indicated at 37 and 38 and the pivot being held as by washers and cotter pins. One of the legs of each pair is formed with a quadrant 39 having a pair of holes 40 therethrough which may be brought into registry with holes indicated at 41 in the main member 14 so that a pin 42 may be passed through registering holes to hold the legs in either the spread position shown in Fig. 1 or the folded position shown in Fig. 2.

Means are fixed on the main member 14 for releasably locking a differential assembly or the like against turning when resting in the saddles 32. Such locking means comprise a pivot 45 having an end thereof undercut to form a shoulder and with the undercut end portion threaded and of a size to pass through a hole in the web or main member 14. A nut 46 is threaded on the pivot end for holding the pivot in the main member for rotation. An arm 47 is attached to the upper end of the pivot 45 and has a row of spaced holes 48 along its center line, into which a hook 49 may be inserted. The hook is threaded for the full length of its shank 50 to receive nuts 51, 52 by which the extension of the hook above the arm can be adjusted and by which the entire locking means can be put under stress when it is in use in holding a differential or the like on the receiver-stand.

In use, the receiver-stand is placed on the floor jack with its leg folded and held in folded position while the jack is wheeled into position under the automobile differential assembly or another assembly to be repaired. The saddle columns are then adjusted in height to bring the saddles as nearly as possible into position for seating the differential assembly therein and the jack is then operated to lift the receiver-stand to bring the saddles firmly under the differential. The two locking means are then severally swung into position at which the hooks thereof may be adjusted to bear on or engage in portions of the differential assembly and preferably as nearly adjacent the ends of the assembly as possible. The differential assembly is now disconnected from the remainder of the automobile and the jack head is lowered so that the jack and the receiver-stand with the differential assembly can now be pulled to a place where repair work is to be done. The legs are then spread and locked and the jack is released for other use.

If the position of the differential assembly on the receiver-stand is not satisfactory for work thereon, the locking means can be released and the assembly turned in the saddles to any desired position and held there. When the repair work has been completed, the differential is turned back to its original position and held in that position by the locking means. The jack is again brought up to the receiver-stand to lift its legs off the floor so that the legs can again be folded and locked. The jack, etc. need then merely be pushed back to nearly the original position of the differential when it was disconnected and then raised to bring the differential into alignment with other parts whereupon the differential can be directly pushed back into the proper position for reconnection.

It will be seen that the present receiver-stand is of rugged and the simplest possible construction and that it employs the usual floor jack rather than a built-in jack as in the prior devices adapted for similar purposes. Aside from possible turning of the differential for convenience in repairing, one man can do all of the work required in placing the receiver-stand, disconnecting and withdrawing the differential and returning the differential to alignment with other parts for reconnection and reconnecting the same. The entire differential assembly is fully accessible for work thereon or can be made accessible merely by turning the differential in the saddles. The jack is not in use while the repair work is being done and is available for other uses. If the differential assembly is not turned on the receiver-stand, there can be no loss of lubricant and the differential will remain in exactly the necessary position for re-alignment and reconnection except for raising by the jack.

The present receiver-stand is easily adjustable to any height for receiving and returning a differential to the proper portion and the differential is positively held in any given position, even though considerable weight may be overhung to one side thereof. When not in use, the legs of the present receiver-stand can be folded and the device can be stored in a relatively minor space.

Although but one embodiment of the present invention has been illustrated and described, it will be apparent to those skilled in the art that various changes and modifications may be made therein without departing from the spirit of the invention or from the scope of the appended claims.

I claim:

1. A receiver-stand for an automobile differential assembly comprising a main member having a socket for removably and rotatably receiving the lifting head of a jack and having slots therein and extending longitudinally thereof, saddle columns severally retained in the main member slots for free sliding adjustment toward and away from each other, legs pivoted on the ends of the main member, means for releasably holding the legs in spread and in folded positions, and means on the main member for releasably locking the differential assembly against turning in the saddles.

2. A receiver-stand for an automobile differential assembly comprising a main member of channel-shaped cross-section and having longitudinal slots in the web thereof, the main member having a socket for removably and rotatably receiving the lifting head of a jack, the slots being aligned and extending from adjacent the ends toward the center of the main member and totaling no more than one-half the length of the main member, a pair of saddle columns severally extending from the main member in substantially parallel relation and on the same side thereof and retained in the main member slots for free sliding toward and away from each other, the columns being adjustable in height to move the saddles toward and away from the main member, legs pivoted at the ends of the main member, means for releasably holding the legs in spread and in folded positions, and means on the main member for releasably locking the differential assembly against turning in the saddles.

3. A receiver-stand for an automobile differential assembly comprising a main member of channel-shaped cross-section and having longitudinal slots in the web from the ends and for less than one-half the length thereof, the main member having a socket for removably and rotatably receiving the lifting head of a jack, a pair of saddle columns severally retained in the main member slots for free sliding toward and away from each other and extending from the main member in substantially parallel relation and on the same side thereof, the columns being adjustable in height to move the saddles toward and away from the main member, blocks for supporting the columns and having slots receiving the longitudinal edges of the main member slots for limiting column movement to longitudinally of the main member, pivots mounted in the main member adjacent the ends thereof and extending therefrom on the same side thereof as the saddle columns, the columns and the pivots being in alignment and substantially on the center line of the main member, arms severally attached to the pivots and having a row of holes longitudinally thereof, the pivots being threaded for releasable locking thereof and of the arms to the main member, and hooks releasably and severally mounted in a hole in each of the arms, the hooks having fully threaded shanks for adjustment of the length thereof extending from the arms for releasably locking the differential assembly against turning in the saddles.

References Cited in the file of this patent

UNITED STATES PATENTS

| | | |
|---|---|---|
| 1,435,738 | Reiman | Nov. 14, 1922 |
| 1,463,882 | Fuller | Aug. 7, 1923 |
| 1,600,835 | Manley | Sept. 21, 1926 |
| 1,648,474 | Coleman et al. | Nov. 8, 1927 |
| 2,147,800 | Sadowski | Feb. 21, 1939 |
| 2,680,287 | Wilson | June 8, 1954 |
| 2,724,571 | Friedman et al. | Nov. 22, 1955 |
| 2,748,459 | Orr | June 5, 1956 |
| 2,815,566 | Hille | Dec. 10, 1957 |